(12) United States Patent
Liebmann et al.

(10) Patent No.: US 6,996,797 B1
(45) Date of Patent: Feb. 7, 2006

(54) METHOD FOR VERIFICATION OF RESOLUTION ENHANCEMENT TECHNIQUES AND OPTICAL PROXIMITY CORRECTION IN LITHOGRAPHY

(75) Inventors: Lars W. Liebmann, Poughquag, NY (US); James A. Culp, Downington, PA (US); Ioana C. Graur, Poughkeepsie, NY (US); Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/904,600

(22) Filed: Nov. 18, 2004

(51) Int. Cl.
*G06F 17/50* (2006.01)
(52) U.S. Cl. .......................... 716/19; 716/21
(58) Field of Classification Search .................. 716/19, 716/21; 430/5
See application file for complete search history.

(56) References Cited

U.S. PATENT DOCUMENTS

| | | | | |
|---|---|---|---|---|
| 6,687,895 B2 * | 2/2004 | Zhang | .......................... | 716/19 |
| 6,799,313 B2 | 9/2004 | LaCour | | |
| 2001/0052107 A1 | 12/2001 | Anderson et al. | | |
| 2003/0014731 A1 * | 1/2003 | LaCour | ........................ | 716/21 |
| 2004/0102945 A1 | 5/2004 | Liu | | |
| 2004/0139418 A1 | 7/2004 | Shi et al. | | |
| 2004/0194050 A1 | 9/2004 | Hwang et al. | | |
| 2005/0066300 A1 * | 3/2005 | Zach | ........................... | 716/19 |
| 2005/0210438 A1 * | 9/2005 | Verstappen et al. | ........... | 716/21 |

* cited by examiner

*Primary Examiner*—Paul Dinh
(74) *Attorney, Agent, or Firm*—Lisa U. Jaklitsch; Cantor Colburn LLP

(57) ABSTRACT

A method for model-based verification of resolution enhancement techniques (RET) and optical proximity correction (OPC) in lithography includes scaling shapes of a drawn mask layout to their corresponding intended wafer dimensions so as to create a scaled image. A first feature of the scaled image is shifted with respect to a second feature thereof in accordance with a predetermined maximum overlay error. An intersection parameter of the first and said second features of the scaled image is calculated so as to determine a yield metric of an ideal layout. A first feature of a simulated wafer image is shifted with respect to a second feature thereof in accordance with the predetermined maximum overlay error. An intersection parameter of the first and said second features of the simulated wafer image is calculated so as to determine a yield metric of a simulated layout, and the yield metric of the simulated wafer image is compared to the yield metric of the scaled image.

20 Claims, 5 Drawing Sheets

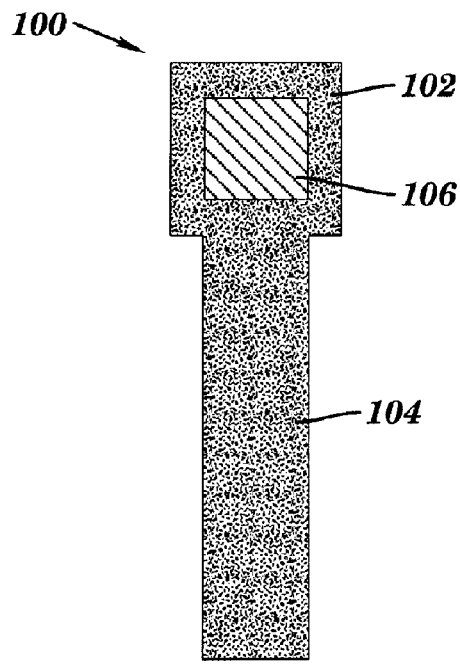
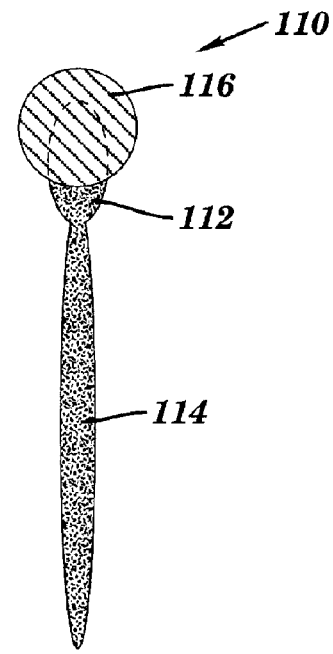
FIG. 1(a)     FIG. 1(b)
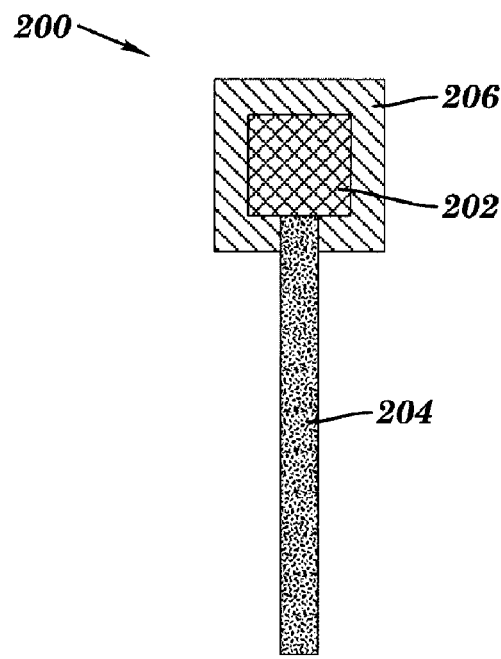
FIG. 2

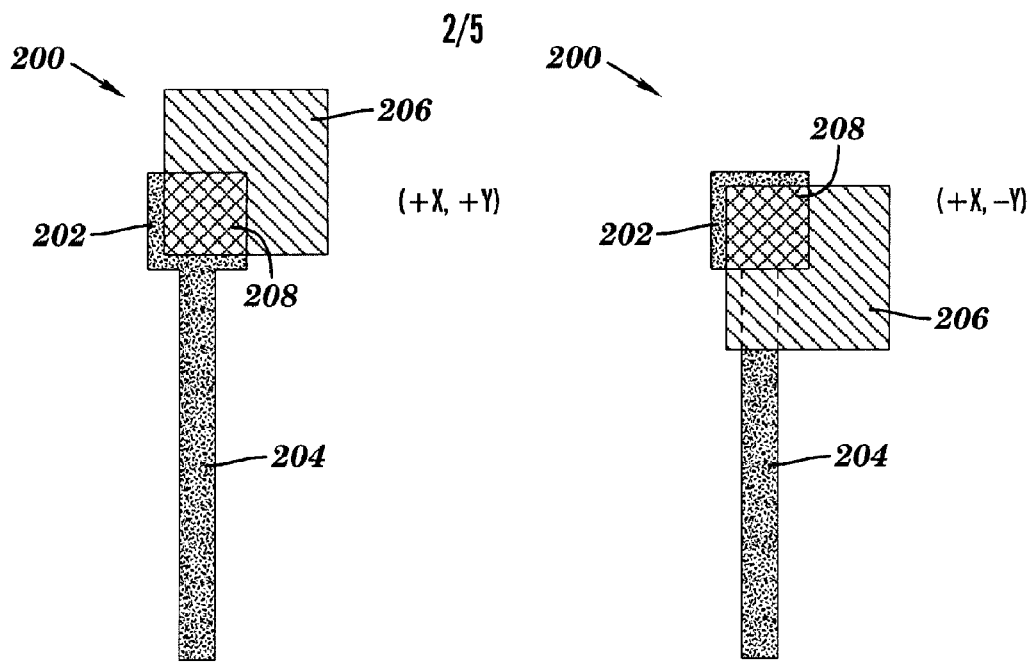
FIG. 3(a)      FIG. 3(b)
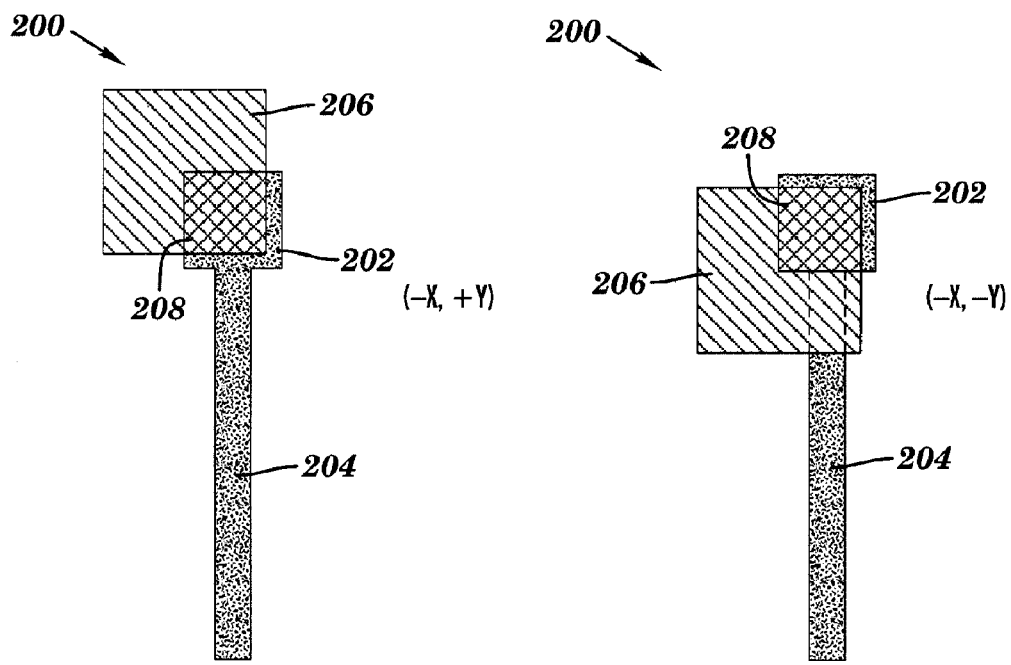
FIG. 3(c)      FIG. 3(d)

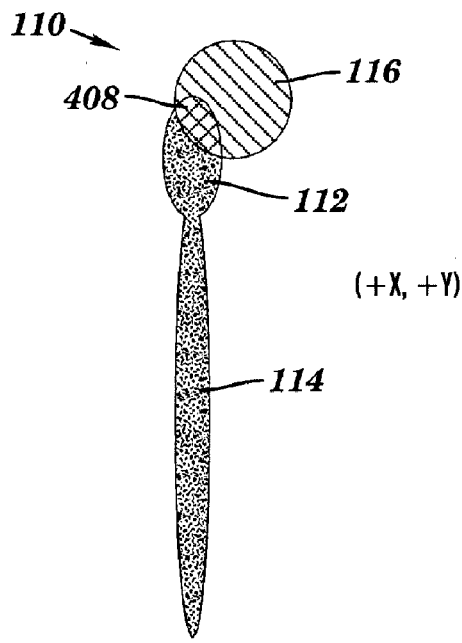
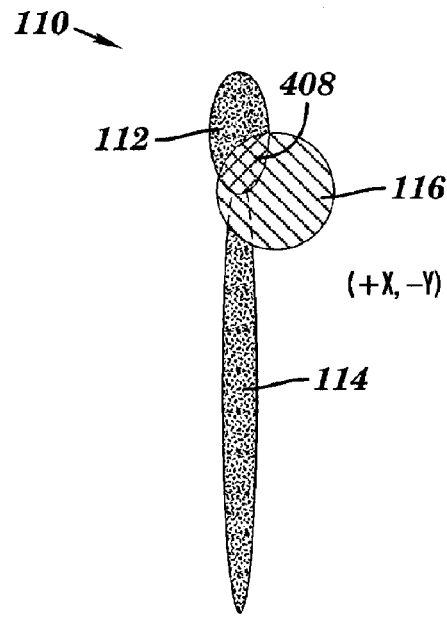
FIG. 4(a)    FIG. 4(b)
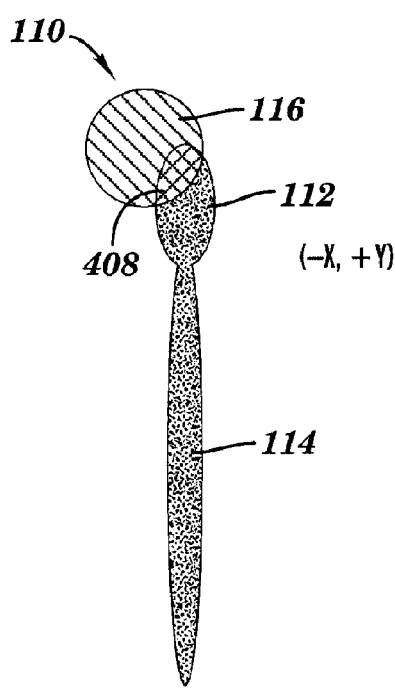
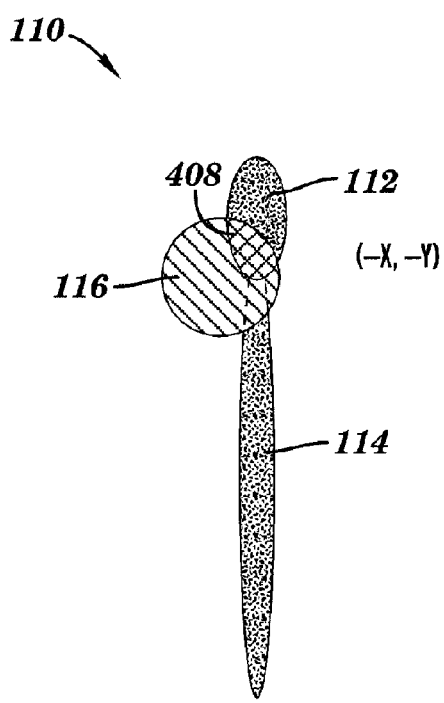
FIG. 4(c)    FIG. 4(d)

METHOD FOR VERIFICATION OF RESOLUTION ENHANCEMENT TECHNIQUES AND OPTICAL PROXIMITY CORRECTION IN LITHOGRAPHY

BACKGROUND OF INVENTION

The present invention relates generally to semiconductor device manufacturing, and, more particularly, to a method and system for verification of resolution enhancement techniques and optical proximity correction in lithography.

The fabrication of integrated circuits on a semiconductor substrate typically includes multiple photolithography steps. A photolithography process begins by applying a thin layer of a photoresist material to the substrate surface. The photoresist is then exposed through a photolithography exposure tool to a radiation source that changes the solubility of the photoresist at areas exposed to the radiation. The photolithography exposure tool typically includes transparent regions that do not interact with the exposing radiation and a patterned material or materials that do interact with the exposing radiation, either to block it or to shift its phase.

As each successive generation of integrated circuits crowds more circuit elements onto the semiconductor substrate, it becomes necessary to reduce the size of the features, i.e., the lines and spaces that make up the circuit elements. The minimum feature size that can be accurately produced on a substrate is limited by the ability of the fabrication process to form an undistorted optical image of the mask pattern onto the substrate, by the chemical and physical interaction of the photoresist with the developer, and by the uniformity of the subsequent process (e.g., etching or diffusion) that uses the patterned photoresist.

When a photolithography system attempts to print circuit elements having sizes near the wavelength of the exposing radiation, the resulting shapes of the printed circuit elements become significantly different from the corresponding pattern on the mask. For example, line widths of circuit elements may vary depending on the proximity of other lines. The inconsistent line widths can then cause circuit components that should be identical to operate at different speeds, thereby creating problems with the overall operation of the integrated circuit. As another example, line ends tend to shorten or "pull back." The small amount of shortening becomes more significant as the lines themselves are made smaller. Furthermore, pulling back of the line ends can cause connections to be missed or to be weakened and prone to failure.

Accordingly, Optical Proximity Correction (OPC) was developed in the early 1970's as a means of addressing lithography distortions in semiconductor manufacturing. The goal of OPC is to produce smaller features in an IC using a given equipment set by enhancing the "printability" of a wafer pattern. In particular, OPC applies systematic changes to photomask geometries to compensate for non-linear distortions caused by optical diffraction and resist process effects. For example, these distortions include line width variations dependent on pattern density that affect a device's speed of operation, and line end shortening that can break connections to contacts. Causes include reticle pattern fidelity, optical proximity effects, and diffusion and loading effects during resist and etch processing. A mask incorporating OPC is thus a system that seeks to negate undesirable distortion effects during pattern transfer.

OPC works by making small changes to the IC layout that anticipate the distortions. To compensate for line end shortening, the line is extended using a hammerhead shape that results in a line in the resist that is much closer to the original intended layout. To compensate for corner rounding, serif shapes are added to (or subtracted from) corners to produce corners in the silicon that are closer to the ideal layout. Determining the optimal type, size, and symmetry (or lack thereof) is very complex and depends on neighboring geometries and process parameters. Moreover, a sophisticated computer program is typically necessary to properly implement OPC.

Thus, as the gap between desired and available lithography resolution continues to widen, even more complex resolution enhancement techniques (RET) and OPC are employed to maintain profitable chip yields. However, the task of verifying whether these complex RET and OPC solutions have achieved optimized (or even adequate) mask patterns is not a trivial endeavor. Model-based verification, also referred to as optical rules checking (ORC), is an approach in which shape checking is implemented on simulated wafer images. Although simulated wafer images of RET and OPC enhanced layout shapes provide excellent qualitative insight into the patterning of certain layout shapes (and in some cases allow the extraction of quantitative information such as localized feature width or space), it is extremely difficult to guarantee that all of the millions of shapes on a given photomask will yield functional circuitry. This is in part due to the challenge of formulating efficient, fail-safe measurements on a vast number of simulated images without drowning the output report with false nuisance errors.

Another contributing factor for making reliable ORC on large designs difficult is the ambiguous nature of the wafer target specifications. Some parameters, such as channel length control, are extremely well specified and can be measured in the simulated image. However, many catastrophic wafer failures occur on complex two-dimensional shapes, often involving inter-level interactions that cannot be easily specified or measured on a simulated wafer image.

SUMMARY OF INVENTION

The foregoing discussed drawbacks and deficiencies of the prior art are overcome or alleviated by a method for model-based verification of resolution enhancement techniques (RET) and optical proximity correction (OPC) in lithography. In an exemplary embodiment, the method includes scaling shapes of a drawn mask layout to their corresponding intended wafer dimensions so as to create a scaled image. A first feature of the scaled image is shifted with respect to a second feature of the scaled image in accordance with a predetermined maximum overlay error. An intersection parameter of the first and said second features of the scaled image is calculated so as to determine a yield metric of an ideal layout. A first feature of a simulated wafer image of the drawn mask layout is shifted with respect to a second feature of the simulated wafer image in accordance with the predetermined maximum overlay error, wherein the first and second features of said simulated wafer image correspond to the first and second features of the scaled image. An intersection parameter of the first and said second features of the simulated wafer image is calculated so as to determine a yield metric of a simulated layout, and the yield metric of the simulated wafer image is compared to the yield metric of the scaled image.

In another embodiment, a system for model-based verification of resolution enhancement techniques (RET) and optical proximity correction (OPC) in lithography includes a means for scaling shapes of a drawn mask layout to their corresponding intended wafer dimensions so as to create a scaled image. A first feature of the scaled image is shifted with respect to a second feature of the scaled image in accordance with a predetermined maximum overlay error. An intersection parameter of the first and said second features of the scaled image is calculated so as to determine a yield metric of an ideal layout. A first feature of a simulated wafer image of the drawn mask layout is shifted with respect to a second feature of the simulated wafer image in accordance with the predetermined maximum overlay error, wherein the first and second features of said simulated wafer image correspond to the first and second features of the scaled image. An intersection parameter of the first and said second features of the simulated wafer image is calculated so as to determine a yield metric of a simulated layout, and the yield metric of the simulated wafer image is compared to the yield metric of the scaled image.

In still another embodiment, a storage medium includes a machine readable computer program code for model-based verification of resolution enhancement techniques (RET) and optical proximity correction (OPC) in lithography, and instructions for causing a computer to implement a method. The method includes scaling shapes of a drawn mask layout to their corresponding intended wafer dimensions so as to create a scaled image. A first feature of the scaled image is shifted with respect to a second feature of the scaled image in accordance with a predetermined maximum overlay error. An intersection parameter of the first and said second features of the scaled image is calculated so as to determine a yield metric of an ideal layout. A first feature of a simulated wafer image of the drawn mask layout is shifted with respect to a second feature of the simulated wafer image in accordance with the predetermined maximum overlay error, wherein the first and second features of said simulated wafer image correspond to the first and second features of the scaled image. An intersection parameter of the first and said second features of the simulated wafer image is calculated so as to determine a yield metric of a simulated layout, and the yield metric of the simulated wafer image is compared to the yield metric of the scaled image.

BRIEF DESCRIPTION OF DRAWINGS

Referring to the exemplary drawings wherein like elements are numbered alike in the several Figures:

FIG. 1(a) illustrates a portion of an exemplary integrated circuit layout featuring a poly-conductor (PC) and associated conductive trace, along with a contact (CA) in diagonal hatch for connecting the PC to an upper wiring level;

FIG. 1(b) illustrates an exemplary view of one possible simulated wafer image of the design layout of FIG. 1(a), after the application of RET and OPC;

FIG. 2 illustrates the exemplary integrated circuit layout shape of FIG. 1(a), scaled down to the approximate dimensions of the predicted, simulated image of FIG. 1(b);

FIGS. 3(a) through 3(d) illustrate the scaled integrated circuit layout of FIG. 2, wherein the PC to CA intersection is offset (simulated overlay error) by a determined maximum amount in each of four X–Y quadrants;

FIGS. 4(a) through 4(d) illustrate the simulated wafer image of FIG. 1(b), wherein the PC to CA intersection is offset by the amount in each of the four X–Y quadrants as shown in FIGS. 3(a) through 3(d);

DETAILED DESCRIPTION

Figure 5:
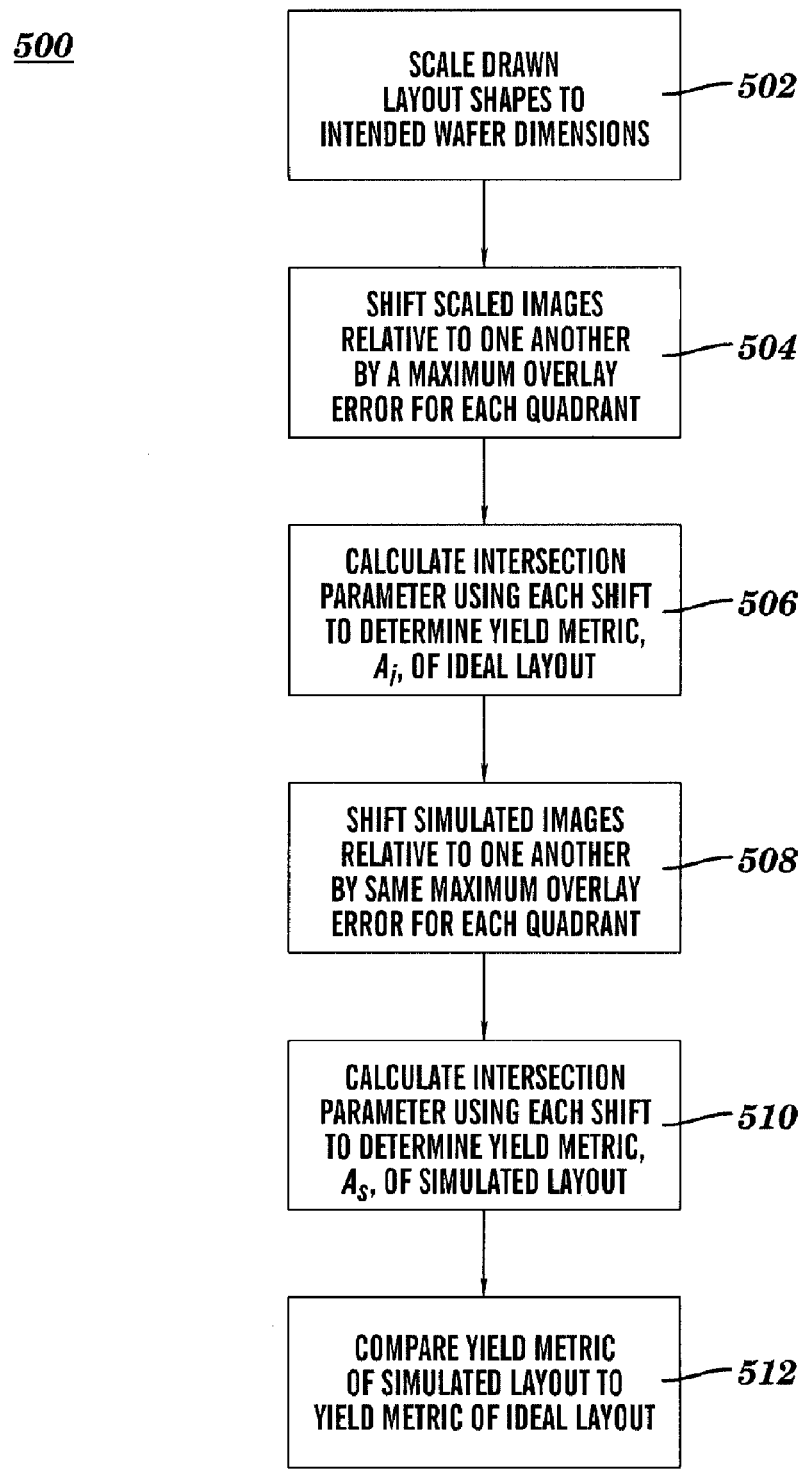
FIG. 5 is a flow diagram illustrating a method for verification of resolution enhancement techniques and optical proximity correction in lithography, in accordance with an embodiment of the invention.

Referring initially to FIG. 1(a), there is shown a portion of an exemplary integrated circuit layout 100 featuring a poly-conductor (PC) 102 (depicted in solid) and associated conductive trace 104, along with a contact area (CA) 106 (depicted in diagonal cross hatching) for landing a connection to an upper wiring level with respect to the PC. As indicated above, when a photolithography system attempts to print circuit elements having sizes near the wavelength of the exposing radiation, the resulting shapes of the printed circuit elements become significantly different from the corresponding pattern on the mask. Accordingly, simulated wafer images of RET and OPC enhanced layout shapes have been used in an attempt to provide qualitative insight into the patterning of certain layout shapes. FIG. 1(b) thus illustrates an exemplary view of one possible simulated wafer image 110 of the design layout 100 of FIG. 1(a). As will be noted, the simulated wafer image 110 depicts the distortions in the simulated PC 112 and trace 114, as well as the contact area 116. The simulated wafer image 110 may be generated through the use of an existing model-based, empirically calibrated lithography simulation tool, such as those commonly used in model-based optical proximity correction or model-based verification, for example.

However, notwithstanding the present capabilities of producing a simulated wafer image (in particular, using the very simple example of a square landing pad on a straight trace), it is still a very difficult proposition to quantitatively judge whether the RET and OPC techniques that were applied to the design layout shapes will actually result in acceptable wafer images. In other words, despite the ability to generate a simulated wafer image as shown in FIG. 1(b), there is still no way of reliably predicting (based on the simulated image alone) whether the design will yield functional chips or not.

Therefore, in accordance with an embodiment of the invention, a method and system for using model-based verification is disclosed to reliably identify catastrophic failures in RET and OPC enhanced mask images. The method is implemented by first scaling the drawn layout shapes of the IC design to their intended wafer target dimensions. For example, FIG. 2 illustrates a scaled image 200 (with respect to image 100 of FIG. 1(a)) of the poly-conductor 202 and trace 204, at dimensions comparable to the simulated wafer image 110. In the scaled image 200, the contact area 206 is centered over the PC 202. Thus, in an ideal case, the intersection of the contact area 206 and the PC area represents the entire area of the PC 206, as illustrated in the double crosshatched region.

Then, as shown in FIGS. 3(a) through 3(d), the PC 202 and CA 206 of the scaled images are then shifted relative to one other by a predetermined maximum overlay error under which the chip is targeted to function properly. In an exemplary embodiment, this overlay shift is implemented for each quadrant of an X–Y grid (i.e., +X+Y, −X+Y, −X−Y, +X−Y). In each instance, the area of the intersected PC and CA regions (shown in double crosshatch) yields a parameter that is fundamentally responsible for the proper functionality of this simple layout configuration. Calculating this PC to CA intersection area may be easily accomplished with conventional CAD tools, and results in a baseline functionality or yield metric, $A_i$, of the ideal layout. In one embodiment, $A_i$ may be determined by a sum of the intersected regions from each overlay shift.

Corresponding to each overlay shift of the scaled image 200, the same shifting operations are then performed for the simulated wafer image 110 of FIG. 1(b). That is, the simulated PC 202 and CA 206 of the simulated wafer image 110 are shifted relative to one other by the same predetermined maximum overlay error, for each of the four quadrants of the X–Y grid. The shifting of the simulated wafer image 110 by the maximum overlay error in each quadrant is depicted in FIGS. 4(a) through 4(d). The resulting intersection of the simulated PC 112 and CA 116 determines the actual functionality or yield metric, $A_s$, (under worst case overlay conditions) as predicted by the patterning simulations. Where $A_i$ is determined by a sum of the intersected regions from each overlay shift of the scaled image 200, then $A_s$ is correspondingly determined by a sum of the intersected regions from each overlay shift of the simulated image 110.

Regardless of the details of a local layout environment, catastrophic RET or OPC failures may now be identified by consideration of an excessive variation parameter, Δ, in the respective functionality or yield metric of the simulated image 110 with respect to the scaled wafer image 200 through the expression:

$$\Delta = (A_i - A_s)/A_i$$

A certain amount of ambiguity as to the exact value of overlay area, $A_i$ for which a chip fails remains, however, a difficulty in specifying catastrophic failure limits for all layout situations. However, by experimentally determining a single parameter, Δ, (which represents a ratio of the difference in ideal and simulated overlay area to the ideal overlay area), it will be seen that yield ramps may be driven by progressively shrinking Δ over time by improving the RET, OPC, or patterning solutions.

To summarize the above approach, FIG. 5 illustrates a process flow diagram illustrating a method 500 for using model-based verification to reliably identify catastrophic failures in RET and OPC enhanced mask images. As shown in block 502, the method 500 begins by scaling the drawn mask layout shapes to their intended wafer dimensions. The scaled images are shifted relative to one another by a predetermined maximum overlay error, as shown in FIG. 504. In the exemplary embodiment described, there are four overlay error shifts implemented (one for each quadrant of an X–Y axis). However, a greater or lesser number of overlay shifts could also be performed. Then, as shown in block 506, the subject intersection parameter (e.g., polyconductor to contact intersection area) is calculated for each overlay shift to determine a yield metric of an ideal layout. It should be understood that although a single layout situation is illustrated herein, the concept is equally applicable to a variety of inter- and intra-level performance or yield parameters.

Moreover, although the exemplary embodiment described herein is presented in terms of comparing the intersection areas of the scaled and simulated images, it will be appreciated that other intersection "parameters" may be used in this comparison. For example, an intersection perimeter of contact area to poly-conductor region could also be determined and compared for scaled and simulated images. Thus, while the perimeter of the intersection of poly-conductor and contact area shapes may result in a nicely defined rectangle for a scaled image, the corresponding intersection of the same shapes in the simulated image may be markedly different in the simulated image due to effects such as corner rounding, as well as inter-shape spaces (e.g., a metal line that snakes around a contact it is not intended to touch).

Referring still to FIG. 5, as shown in block 508, the simulated wafer images (e.g., such as those produced by model-based verification techniques known in the art) are shifted in the same manner using the same maximum overlay error as the scaled images. The intersection area of the simulated PC and CA regions, using each overlay shift, is then calculated to determine a yield metric of the simulated layout, as shown in block 510. The determined yield metric of the simulated image is then compared with the determined yield metric of the scaled image in accordance with the expression given above to establish an "excessive variation" parameter, Δ, as shown in block 512.

Figure 6:
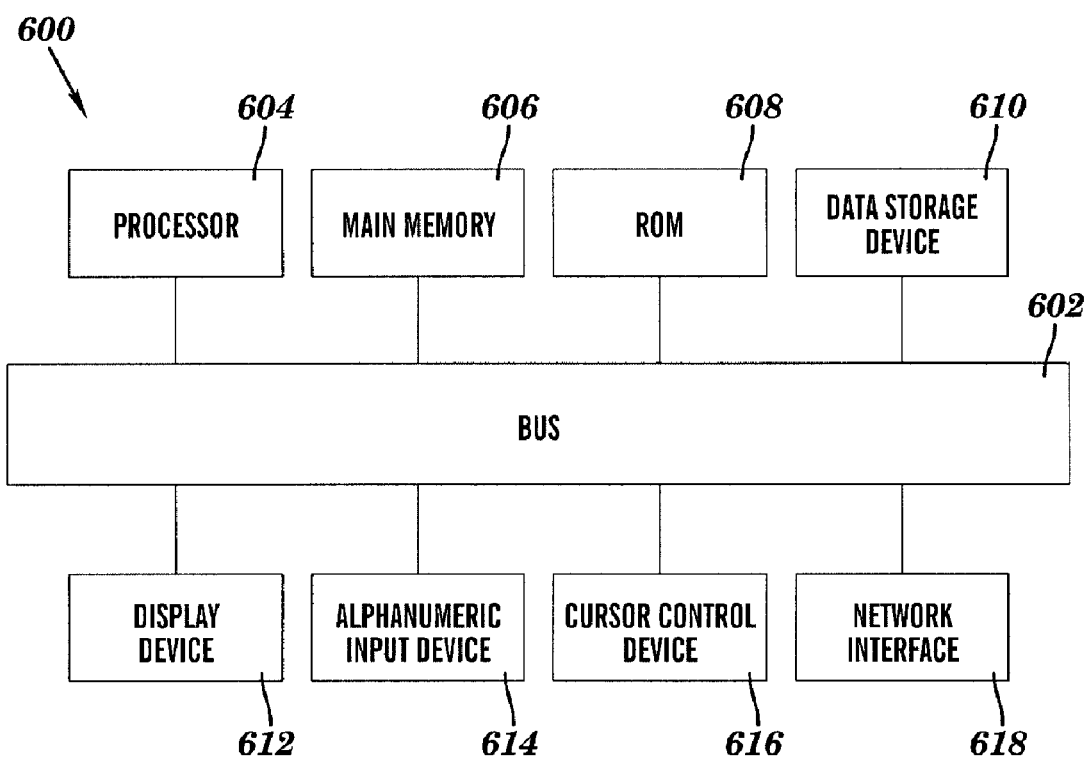
FIG. 6 is an exemplary computing system in which the method of FIG. 5 may be implemented.

Finally, FIG. 6 is a block diagram of an embodiment of an exemplary computer system 600 in which the method of FIG. 5 may be implemented. The computer system 600 illustrated in FIG. 6 is intended to represent a broad range of computer systems, and thus alternative computer systems may include more, fewer and/or different components.

As shown in FIG. 6, the computer system 600 includes a bus 602 or other communication device to communicate information, as well as a processor 604 coupled to the bus 602 to process information. Although the computer system 600 is illustrated with a single processor, multiple processors and/or co-processors may also be included. In a multiprocessor embodiment, operations performed by the various verification and manufacturability tools may divided by cells, bins or other techniques for dividing work between processors. For example, a single cell is operated upon by a processor while another cell is operated upon by a different processor. When the cell operations are complete, the processor can perform verification operations on another cell.

A random access memory (RAM) or other type of dynamic storage device 606 (depicted as main memory in FIG. 6) is coupled to the bus 602 to store information and instructions to be executed by processor 604. The main memory 606 may also be used to store temporary variables or other intermediate information during execution of instructions by a processor 602. A read only memory (ROM) and/or other static data storage device 608 is also shown coupled to bus 602 for storing static information and other instructions carried out by processor 604, while data storage device 610 (e.g., a magnetic disk or optical disc and corresponding drive) is coupled to bus 602 for storing information and instructions.

The computer system 600 may also be coupled via the bus 602 to a display device 612, such as a cathode ray tube (CRT) or liquid crystal display (LCD), for displaying information to a computer user. An alphanumeric input device 614, including alphanumeric and other keys, may be coupled to the bus 602 to allow a user to communicate information and command selections to the processor 604. Another type of user input device that may be associated with computer system 600 is a cursor control device 616, such as a mouse, a trackball, or cursor direction keys to communicate direction information and command selections to processor 602, as well as to control cursor movement on the display device 612. In addition, a network interface 618 may be used to provide access to a network, such as a local area network.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for model-based verification of resolution enhancement techniques (RET) and optical proximity correction (OPC) in lithography, the method comprising:
    scaling shapes of a drawn mask layout to their corresponding intended wafer dimensions so as to create a scaled image;
    shifting a first feature of said scaled image with respect to a second feature of said scaled image in accordance with a predetermined maximum overlay error;
    calculating an intersection parameter of said first and said second features of said scaled image so as to determine a yield metric of an ideal layout;
    shifting a first feature of a simulated wafer image of said drawn mask layout with respect to a second feature of said simulated wafer image in accordance with said predetermined maximum overlay error, wherein said first and second features of said simulated wafer image correspond to said first and second features of said scaled image;
    calculating an intersection parameter of said first and said second features of said simulated wafer image so as to determine a yield metric of a simulated layout; and
    comparing said yield metric of said simulated wafer image to said yield metric of said scaled image.

2. The method of claim 1, wherein said intersection parameter comprises an intersection area.

3. The method of claim 1, further comprising determining an excessive variation parameter, Δ, in accordance with the expression:

$$\Delta = (A_i - A_s)/A_i$$

wherein $A_s$ is said yield metric of said simulated wafer image and $A_i$ is said yield metric of said scaled image.

4. The method of claim 3, wherein:
    said yield metric $A_i$ of said scaled image is determined by calculating an intersection area for each of a plurality of overlay shifts of said first and second features of said scaled image; and
    said yield metric $A_s$ of said simulated wafer image is determined by calculating an intersection area for each of a plurality of overlay shifts of said first and second features of said simulated wafer image.

5. The method of claim 4, wherein:
    said plurality of overlay shifts of said first and second features of said scaled image correspond to diagonal shifts in each of four quadrants of an X–Y axis; and
    said plurality of overlay shifts of said first and second feature of said simulated image also correspond to said diagonal shifts in each of said four quadrants of said X–Y axis.

6. The method of claim 4, wherein:
    said yield metric $A_i$ of said scaled image is determined by the sum of said intersection areas for each of said plurality of overlay shifts of said first and second features of said scaled image; and
    said yield metric $A_s$ of said simulated wafer image is determined by the sum of said intersection areas for each of said plurality of overlay shifts of said first and second features of said simulated wafer image.

7. The method of claim 1, wherein said simulated wafer image of said drawn mask layout is created through a model-based verification tool.

8. A system for model-based verification of resolution enhancement techniques (RET) and optical proximity correction (OPC) in lithography, the method comprising:
    means for scaling shapes of a drawn mask layout to their corresponding intended wafer dimensions so as to create a scaled image;
    means for shifting a first feature of said scaled image with respect to a second feature of said scaled image in accordance with a predetermined maximum overlay error;
    means for calculating an intersection parameter of said first and said second features of said scaled image so as to determine a yield metric of an ideal layout;
    means for shifting a first feature of a simulated wafer image of said drawn mask layout with respect to a second feature of said simulated wafer image in accordance with said predetermined maximum overlay error, wherein said first and second features of said simulated wafer image correspond to said first and second features of said scaled image;
    means for calculating an intersection parameter of said first and said second features of said simulated wafer image so as to determine a yield metric of a simulated layout; and
    means for comparing said yield metric of said simulated wafer image to said yield metric of said scaled image.

9. The system of claim 8, wherein said intersection parameter comprises an intersection area.

10. The system of claim 8, further comprising means for determining an excessive variation parameter, Δ, in accordance with the expression:

$$\Delta = (A_i - A_s)/A_i$$

wherein $A_s$ is said yield metric of said simulated wafer image and $A_i$ is said yield metric of said scaled image.

11. The system of claim 10, wherein:
    said yield metric $A_i$ of said scaled image is determined by calculating an intersection area for each of a plurality of overlay shifts of said first and second features of said scaled image; and
    said yield metric $A_s$ of said simulated wafer image is determined by calculating an intersection area for each of a plurality of overlay shifts of said first and second features of said simulated wafer image.

12. The system of claim 11, wherein:

said plurality of overlay shifts of said first and second features of said scaled image correspond to diagonal shifts in each of four quadrants of an X–Y axis; and said plurality of overlay shifts of said first and second feature of said simulated image also correspond to said diagonal shifts in each of said four quadrants of said X–Y axis.

13. The system of claim 11, wherein:

said yield metric $A_i$ of said scaled image is determined by the sum of said intersection areas for each of said plurality of overlay shifts of said first and second features of said scaled image; and said yield metric $A_s$ of said simulated wafer image is determined by the sum of said intersection areas for each of said plurality of overlay shifts of said first and second features of said simulated wafer image.

14. The system of claim 8, wherein said simulated wafer image of said drawn mask layout is created through a model-based verification tool.

15. A storage medium, comprising:

a machine readable computer program code for model-based verification of resolution enhancement techniques (RET) and optical proximity correction (OPC) in lithography; and instructions for causing a computer to implement a method, the method further comprising:

scaling shapes of a drawn mask layout to their corresponding intended wafer dimensions so as to create a scaled image;

shifting a first feature of said scaled image with respect to a second feature of said scaled image in accordance with a predetermined maximum overlay error;

calculating an intersection area of said first and said second features of said scaled image so as to determine a yield metric of an ideal layout;

shifting a first feature of a simulated wafer image of said drawn mask layout with respect to a second feature of said simulated wafer image in accordance with said predetermined maximum overlay error, wherein said first and second features of said simulated wafer image correspond to said first and second features of said scaled image;

calculating an intersection area of said first and said second features of said simulated wafer image so as to determine a yield metric of a simulated layout; and comparing said yield metric of said simulated wafer image to said yield metric of said scaled image.

16. The method of claim 15, further comprising determining an excessive variation parameter, $\Delta$, in accordance with the expression:

$$\Delta = (A_i - A_s)/A_i$$

wherein $A_s$ is said yield metric of said simulated wafer image, $A_i$ is said yield metric of said scaled image, and said intersection parameters comprise intersection areas.

17. The method of claim 16, wherein:

said yield metric $A_i$ of said scaled image is determined by calculating an intersection area for each of a plurality of overlay shifts of said first and second features of said scaled image; and said yield metric $A_s$ of said simulated wafer image is determined by calculating an intersection area for each of a plurality of overlay shifts of said first and second features of said simulated wafer image.

18. The method of claim 17, wherein:

said plurality of overlay shifts of said first and second features of said scaled image correspond to diagonal shifts in each of four quadrants of an X–Y axis; and said plurality of overlay shifts of said first and second feature of said simulated image also correspond to said diagonal shifts in each of said four quadrants of said X–Y axis.

19. The method of claim 17, wherein:

said yield metric $A_i$ of said scaled image is determined by the sum of said intersection areas for each of said plurality of overlay shifts of said first and second features of said scaled image; and said yield metric $A_s$ of said simulated wafer image is determined by the sum of said intersection areas for each of said plurality of overlay shifts of said first and second features of said simulated wafer image.

20. The method of claim 15, wherein said simulated wafer image of said drawn mask layout is created through a model-based verification tool.

* * * * *